United States Patent [19]

Boczkiewicz

[11] Patent Number: 4,531,780
[45] Date of Patent: Jul. 30, 1985

[54] LIFT MECHANISM FOR A DUMP TRUCK
[75] Inventor: Bruce M. Boczkiewicz, Milwaukee, Wis.
[73] Assignee: The Heil Company, Milwaukee, Wis.
[21] Appl. No.: 414,600
[22] Filed: Sep. 3, 1982
[51] Int. Cl.³ .............................................. B60P 1/32
[52] U.S. Cl. .................................... 298/17.6; 298/12; 298/17.8
[58] Field of Search .................... 298/17.5, 17.6, 17.7, 298/17.8, 12

[56] References Cited
U.S. PATENT DOCUMENTS 3,326,605  6/1967  Steingas et al. ............... 298/17.7
3,620,458  11/1971 Kitchener ..................... 298/17.6 X
4,056,283  11/1977 Pow ............................ 298/17.6

FOREIGN PATENT DOCUMENTS 0145030  11/1980  Japan .......................... 298/17.7

Primary Examiner—Robert J. Spar
Assistant Examiner—Janice Krizek
Attorney, Agent, or Firm—Michael, Best & Friedrich

[57] ABSTRACT

A lift mechanism for a dump truck operative to pivot the dump body rearwardly about a pivot axis at the rear of the hoist frame and operative to pivot the dump body about a pivot axis at the front of the hoist frame. The mechanism includes a lift arm assembly pivotally mounted in the hoist frame and operatively connected to the body. A power cylinder is pivotally connected at one end to the hoist frame and at the other end to the lift arm assembly. First and second pivot supports are located at the rear and front of the hoist frame respectively. A latch means is operative to selectively latch the body to the first and second pivot supports. The second pivot support at the front of the hoist frame includes a support shaft which is adapted for horizontal sliding movement on the hoist frame by means of a pair of horizontal guide rods to which the opposite ends of the support shaft are slidably attached. Thus, when the body is tilted forwardly, the support shaft upon which it is pivoted will slide rearwardly to thereby prevent interference between the dump body and the truck cab.

6 Claims, 9 Drawing Figures

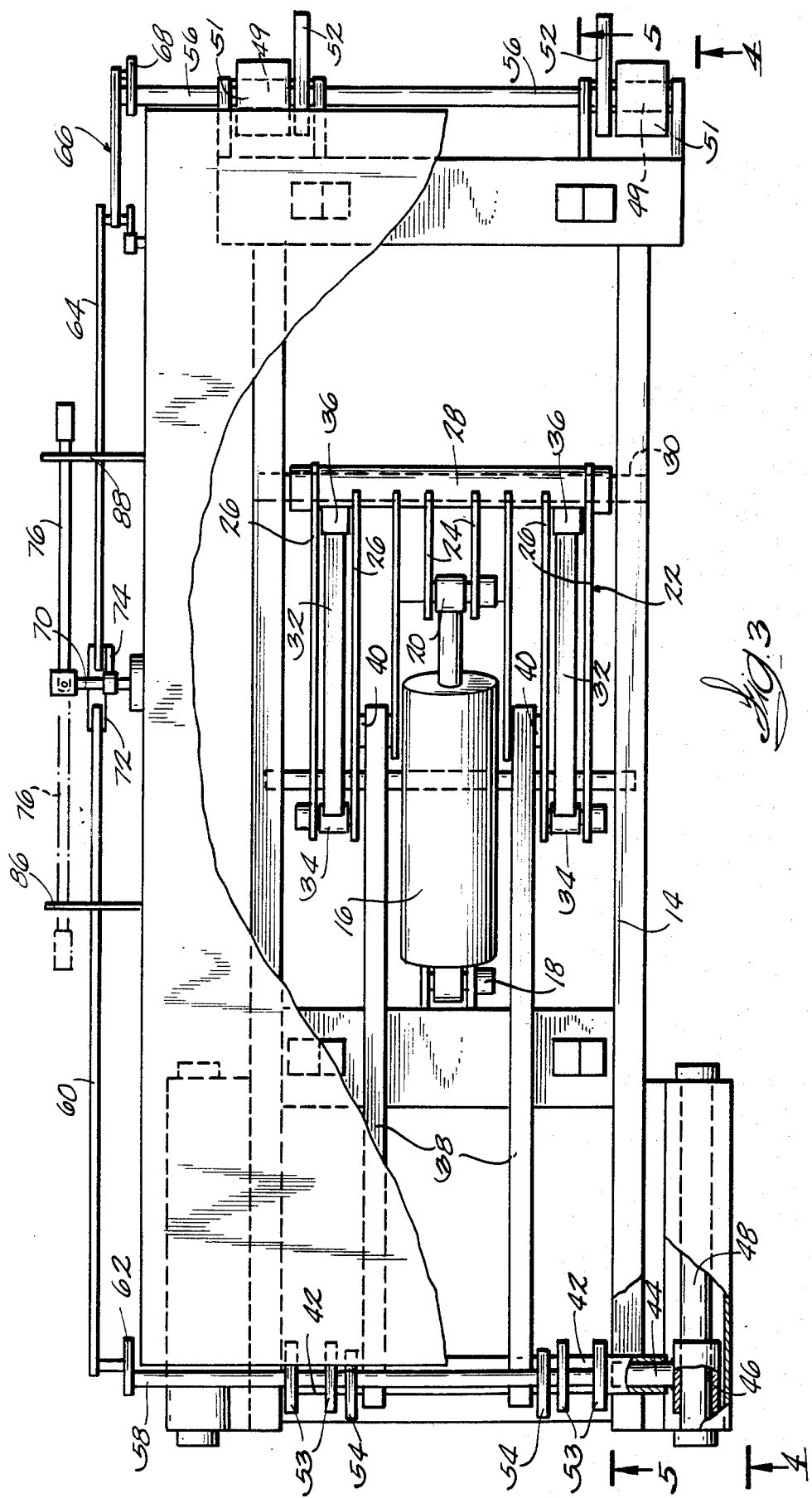

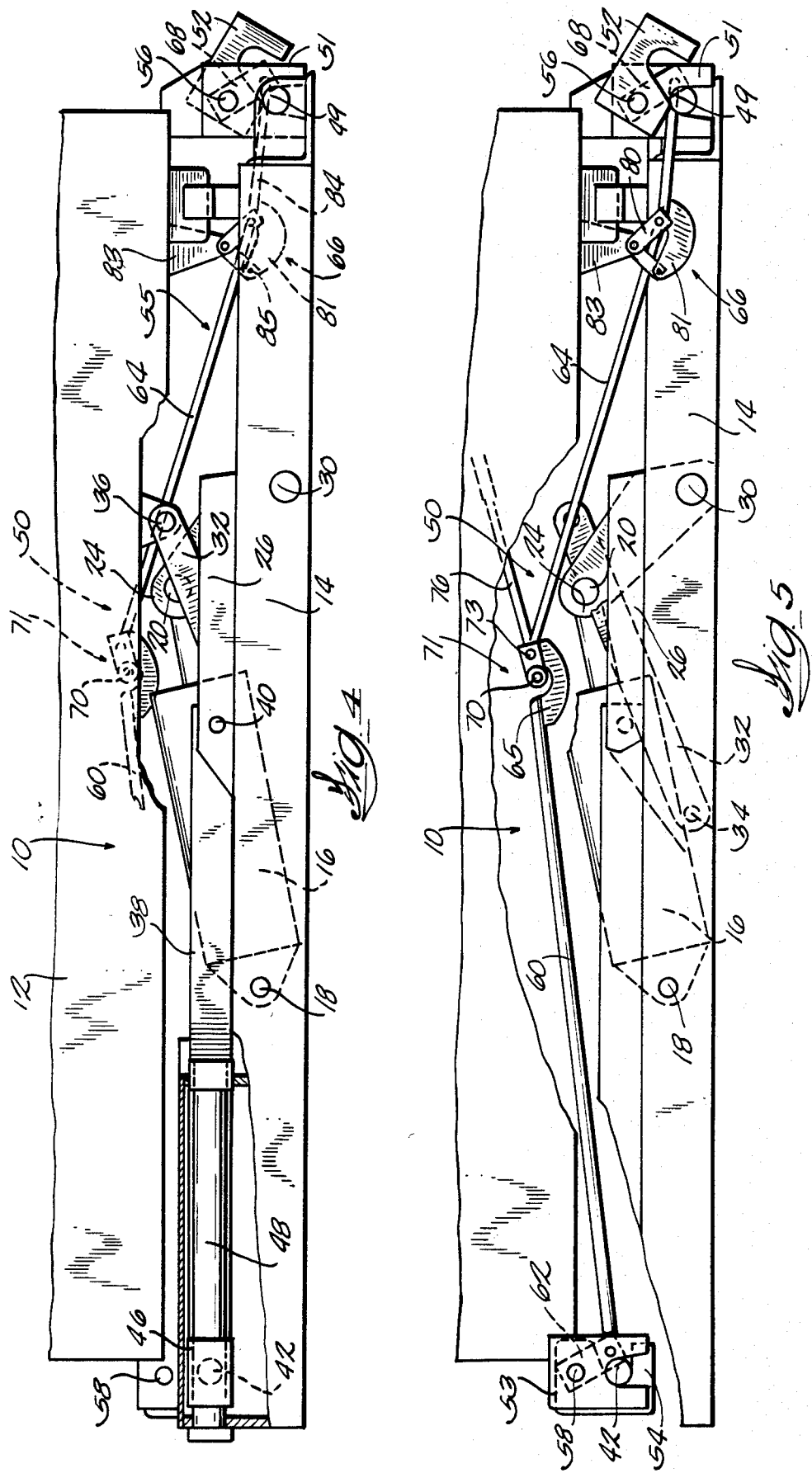

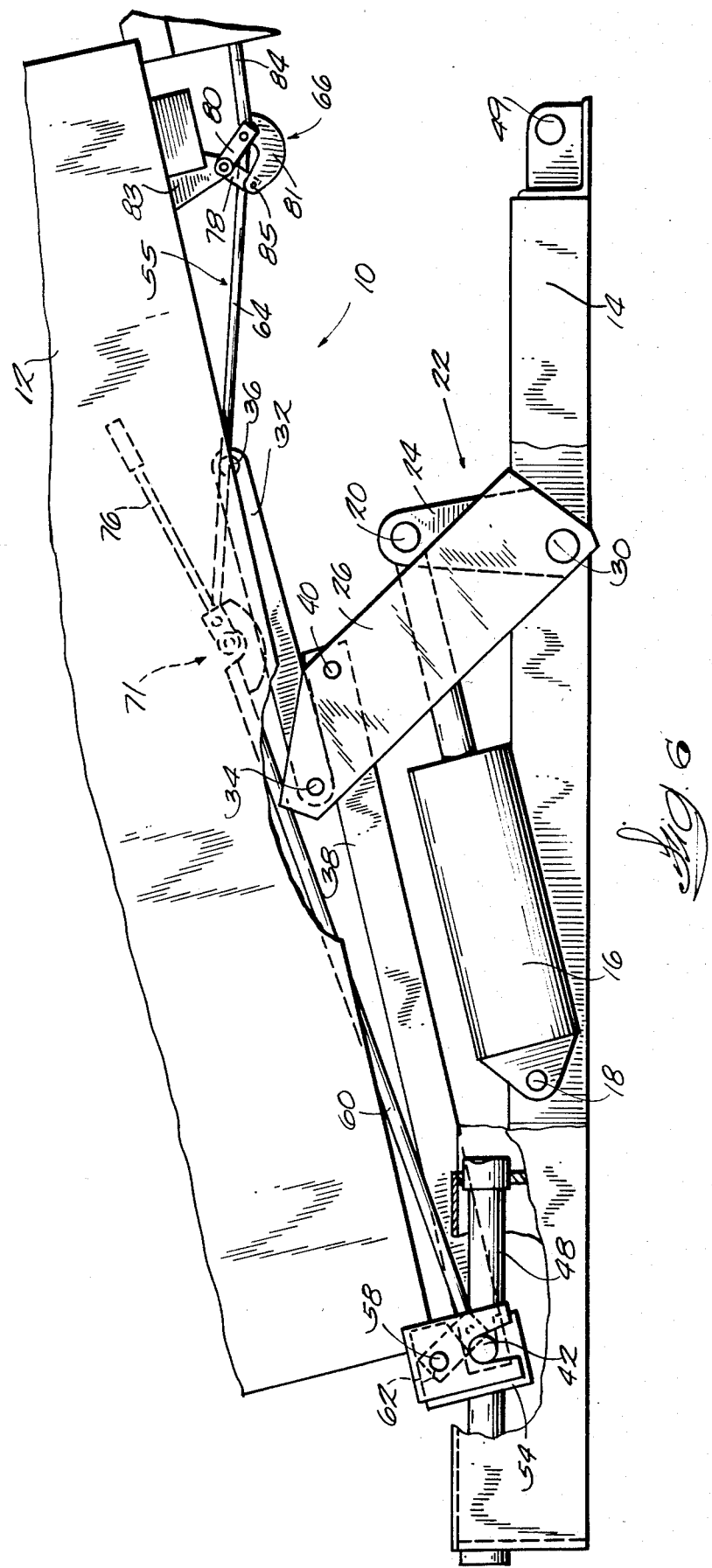

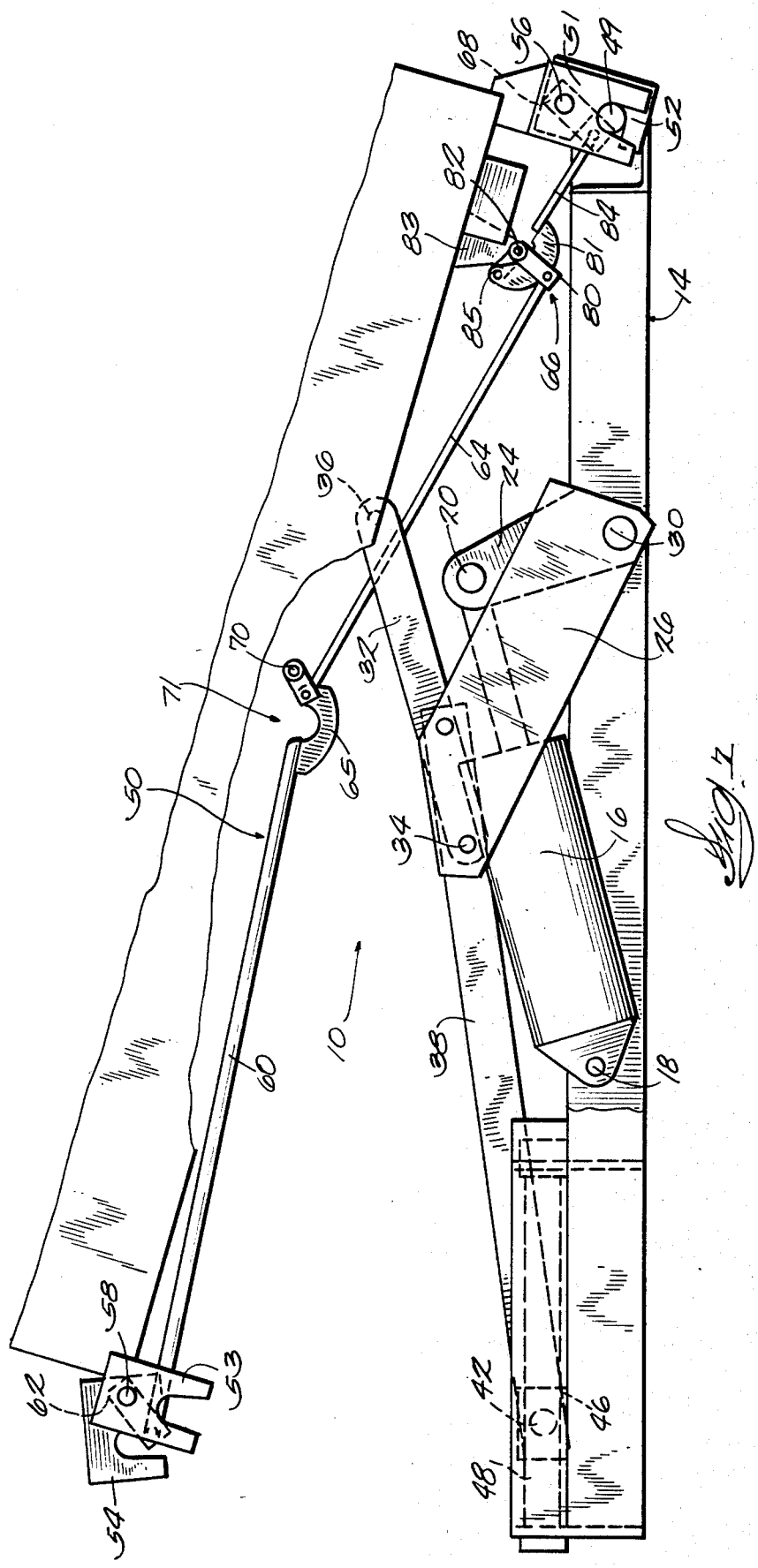

LIFT MECHANISM FOR A DUMP TRUCK

FIELD OF THE INVENTION

This invention relates to a lift mechanism for a dump truck which is operative to pivot the dump body rearwardly about a rear pivot axis and forwardly about a front pivot axis.

DESCRIPTION OF THE PRIOR ART

Lift mechanisms of the general type disclosed herein are shown in U.S. Pat. Nos. 3,620,458 and 4,056,283. The present invention constitutes an improvement over the mechanisms shown in such patents. With the mechanism of U.S. Pat. No. 3,620,458, both the front and rear pivots are stationary. Such arrangement requires that the dump body have a sloping front to avoid interference with the truck cab when the body is pivoted forwardly. U.S. Pat. No. 4,056,283 shows a displaceable pivot arrangement for the front pivot to avoid interference between the truck body and the cab. The lift mechanism of the present invention is constructed differently to provide a stronger and more stable front pivot arrangement. Other advantages of the present construction will be apparent from the detailed description which follows.

SUMMARY OF THE INVENTION

A lift mechanism for supporting and selectively tilting a truck dump body on a truck frame at pivot points located at the front and rear ends of the hoist frame. A lift arm assembly is pivotally mounted in the hoist frame and operatively connected to the body. A cylinder mounted on the hoist frame serves to pivot the lift arm assembly to thereby exert a lifting force on the body. First and second pivot supports are provided at the rear and front of the hoist frame. A latch means operates to selectively latch the body to the first and second pivot supports. The second pivot support at the front of the hoist frame includes a support shaft which is adapted for horixontal sliding movement on the frame by means of a pair of horizontal guide rods to which the opposite ends of the support shaft are slidably attached. When the body is tilted forwardly, the support shaft will slide rearwardly on the guide rods to thereby prevent interference between the body and the truck cab.

DESCRIPTION OF THE DRAWINGS

FIG. 3 is a plan view (with parts broken away) of the dump body lift mechanism;

FIG. 4 is a fragmentary elevation view (with parts broken away) taken along line 4—4 of FIG. 3;

FIG. 5 is a fragmentary elevation view (with parts broken away) taken along line 5—5 of FIG. 3;

FIG. 6 is a fragmentary side elevation view showing the dump body tilted forwardly;

FIG. 7 is a fragmentary side elevation view showing the dump body tilted rearwardly;

DESCRIPTION OF THE PREFERRED EMBODIMENT

Figure 1:
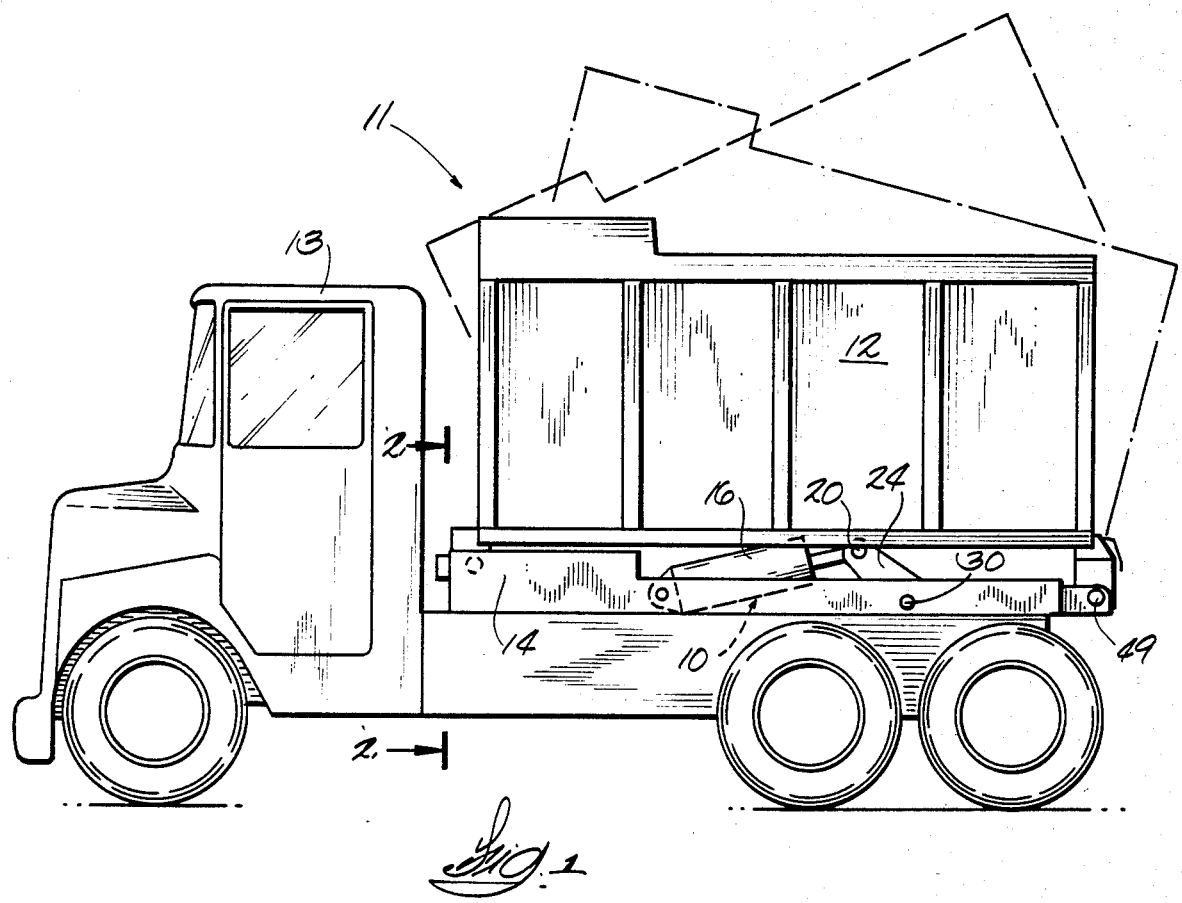
FIG. 1 is a side elevation view of a truck embodying the dump body lift mechanism of the present invention.
Figure 2:
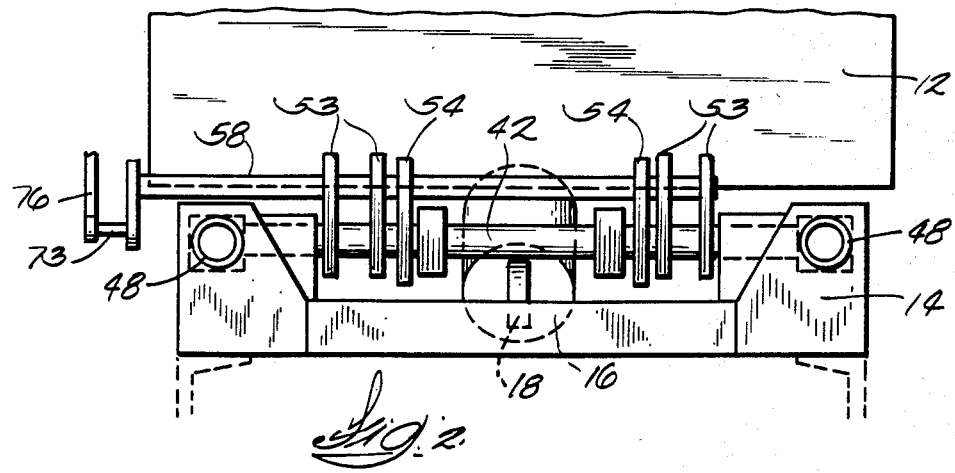
FIG. 2 is a fragmentary elevation view taken along line 2—2 of FIG. 1.

As shown in FIG. 1, the dump body lift mechanism 10 of the present invention is designed for use on a dump truck 11 comprised of a dump body 12 mounted on a hoist frame 14 and a cab 13. For purposes of this explanation, lift mechanism 10 as the term is used herein includes the mechanism for tilting and supporting the truck body and the mechanism for selectively controlling at which end the body is tilted.

As best shown in FIGS. 2-7 the lift mechanism 10 of the present invention includes a power cylinder 16 pivotally connected at one end 18 to hoist frame 14 and pivotally connected at the other end 20 to lift arm assembly 22.

As best shown in FIG. 3, lift arm assembly 22 is comprised of a pair of power cylinder connecting arm members 24, 24 and two pairs of lift arms 26,26, 26,26. Arms 24 and 26 are welded or otherwise fastened to a tube 28 which in turn is pivotally mounted on a shaft 30. Shaft 30 is mounted in the hoist frame 14.

Lift arms 26 are pivotally connected to dump body 12 by a pair of link arms 32,32. One end of each link arm 32 is pivotally connected to a pair of lift arms 26,26 at a pivot 34 and the other end of each link arm 32 is pivotally connected to the dump body at pivot 36.

Lift mechanism 10 further includes a pair of slide links 38,38. One end of each slide link 38 is pivotally connected to link arm assembly 22 at a pivot 40 and the other end of each slide link 38 is welded or otherwise fastened to a tube support member 42. (See FIG. 3).

As will be explained more in detail hereinafter, tube member 42 serves as the front pivot support for the truck body 12. Tube member 42 is constructed for horizontal sliding movement when dump body 12 is tilted. Fitted into each end of tube 42 is a stub shaft member 44, each of which is welded or otherwise fastened to a sleeve member 46. Sleeves 46,46, in turn, are slidably mounted on stationary horizontal guide rod member 48,48.

A pair of dump body support shafts 49,49 are mounted on the rear end of hoist frame 14 to serve as pivot supports when tilting the dump body to the rear. Stationary support brackets 51,51 are mounted on the rear of dump body 12 and pairs of stationary support brackets 53,53, 53,53 are mounted on the front of the dump body. Support brackets 51, 51 cooperate with and are supported by shafts 49,49 for tilting the truck body rearwardly. Support brackets 53,53, 53,53 cooperate with and are supported by tube support member 42 for tilting the truck body forwardly.

As best shown in FIGS. 4 and 5, a latch mechanism 50 is provided to facilitate selective pivotal movement of the dump body about respective transverse axes at the front and rear of the hoist frame 14. Such mechanism 50 is comprised of two pairs of latch members 52,52 and 54,54 pivotally mounted on opposite ends of truck body 12. Latch members 52,52 are mounted on a transverse shaft 56 and latch members 54,54 are mounted on a transverse shaft 58.

Latch mechanism 50 further includes a means for actuating latch members 52 and 54 into and out of engagement with their respective pivot support shafts 42 and 49. As best shown in FIGS. 3 and 5, such means includes an arm 60 connected to shaft 58 by a link 62 and a second arm 64 connected to shaft 56 by an over-center mechanism 66. Over-center mechanism 66 is connected to shaft 56 by a link 68.

Figure 8:
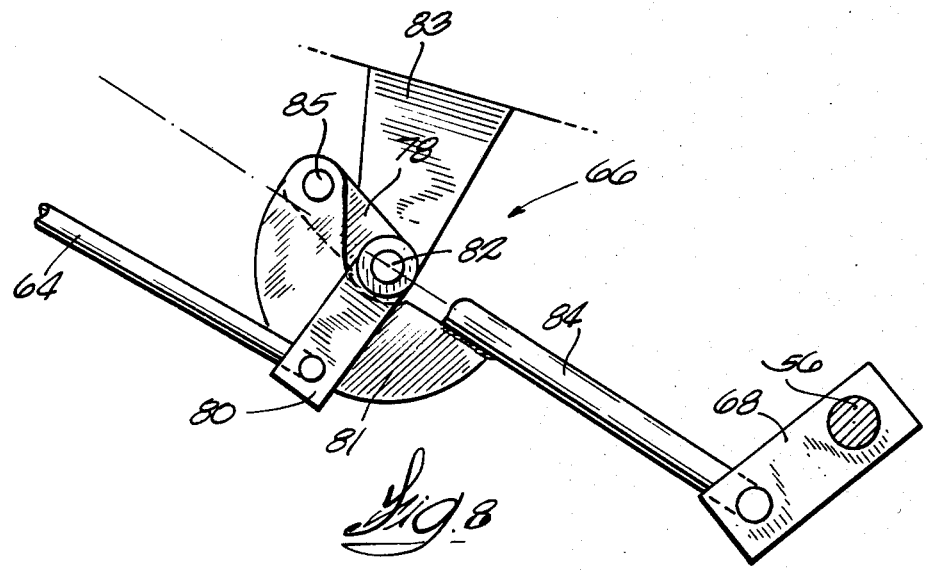
FIG. 8 is a fragmentary view showing the over-center mechanism for locking the dump body to the rear of the hoist frame.

Over-center mechanism 66 (FIG. 8) is comprised of a pair of lever members 78 and 80 welded or otherwise fastened to a pivot shaft 82. Shaft 82 is mounted on the underside of body 12 by a bracket 83. The end of link 80 is pivotally connected to arm 64. The end of link 78 is pivotally connected to the curved end portion 81 of arm 84 which in turn is pivotally connected to link 68. FIG. 8 shows mechanism 66 in its over-center or "lock" position, i.e., with the pivot 85 above the axis of arm 84.

Figure 9:
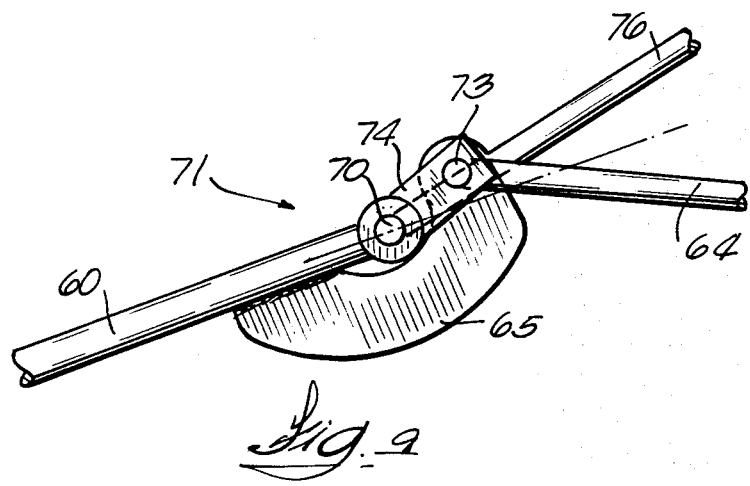
FIG. 9 is a fragmentary view showing the over-center mechanism for locking the truck body to the front of the hoist frame.

As best shown in FIG. 9, arms 60 and 64 are pivotally connected to an actuating shaft 70 by an over-center mechanism 71. The over-center mechanism is comprised of a lever member 74 welded or otherwise fastened to shaft 70. The end of lever 74 is pivotally connected to arm 64 and the curved end portion 65 of arm 60. FIG. 9 shows mechanism 71 in its over-center or "lock" position, i.e., with pivot 73 above the axis of arm 60.

OPERATION

As previously indicated, the dump body lift mechanism of the present invention is designed to selectively tilt the dump body both forwardly and rearwardly.

When it is desired to tilt the dump body 12 rearwardly (as when used as a conventional dump truck), the operator will actuate the latch actuating mechanism 50 to the position shown in FIG. 7 (with handle 76 pointed forwardly). Handle 76 will be retained in such position by a keeper bracket 86 (FIG. 3).

In such position, latch members 52,52 will be engaged with support shafts 49,49 and latch members 54,54 will be disengaged from support shaft 42. Over-center mechanism 66 will be in its over-center or "lock" position as shown in FIG. 8 to thereby securely retain latch members 52,52 in engagement with shafts 49,49.

With the latch mechanism 50 so positioned, energization of power cylinder 16 will cause the dump body 12 to be pivoted about support shafts 49,49 to the position shown in FIG. 7. Normal dumping of dump body 12 to the rear is thus accomplished.

When it is desired to tilt the dump body 12 forwardly (as for example when the truck is used as a spreader), the operator will actuate the latch mechanism to the position shown in FIGS. 5 and 6 (with handle 76 pointed rearwardly). Handle 76 will be retained in such position by a keeper bracket 88 (FIG. 3).

In such position, latch members 54,54 will be engaged with support shaft 42 and latch members 56,56 will be disengaged from support shafts 49,49. Over-center mechanism 71 will be in its over-center or "lock" position as shown in FIG. 9 to thereby securely retain latch members 54,54 in engagement with shafts 42.

With the latch mechanism 50 so positioned, energization of power cylinder 16 will cause the dump body 12 to be tilted to the position shown in FIG. 6. As such tilting movement occurs, slide arms 38,38 will cause sleeves 46,46 to slide along guide rods 48,48. At the same time, pivot support tube 42 will move horizontally toward the rear. It will also rotate on stub shafts 44,44 during this movement. The rearward horizontal movement of tube member 42 as the truck body is tilted forwardly will prevent interference between truck body 12 and the truck cab 13 as indicated by the dotted lines in FIG. 1. The slidable support of tube 42 by means of stub shafts 44,44, sleeves 46,46 and guide rods 48,48 provides a strong and stable support for the dump body throughout its forward tilting movement.

I claim:

1. A lift mechanism for supporting and selectively tilting a truck dump body on a truck frame at pivot points located at the front and rear ends of the truck frame comprising:

a lift arm assembly means pivotally mounted in the truck frame and operatively connected to the dump body, said lift arm assembly adapted when actuated to exert a lifting force on the truck body;

a power cylinder pivotally connected at one end to the truck frame and at the other end to said lift arm assembly means, said power cylinder adapted when energized to cause said lift arm assembly means to pivot on the truck frame;

a first pivot support means for said body located at the rear of the truck frame;

a second pivot support means for said truck body located at the front of the truck frame;

a latch means for selectively latching the body to said first and second pivot support means;

said second pivot support means further including a support shaft for pivotally supporting the body on the front end of the truck frame, said support shaft adapted for horizontal sliding movement on the truck frame by means of a pair of horizontal guide rods to which the opposite ends of said support shaft are slidably attached, said second pivot support means further including a slide link means connected at one end to said support shaft and connected at the other end to said lift arm assembly means, said slide link means adapted to cause said support shaft to slide rearwardly on said guide rods when the body is tilted forwardly about the axis of said support shaft.

2. A lift mechanism according to claim 1 in which said slide link means is comprised of a pair of link members, each of said link members being fastened at one end to said support shaft and pivotally connected at the other end to said lift arm assembly means.

3. A lift mechanism according to claim 1 in which said latch means is movable between first and second latch positions, said latch means adapted when actuated to said first position to latch said body to said first pivot support means and to unlatch said body from said second pivot support means, said latch means further adapted when actuated to said second position to latch said body to said second pivot support means and to unlatch said body from said first pivot support means.

4. A lift mechanism according to claim 3 in which said latch means further includes first and second over-center means, said first over-center means adapted to lock said latch means when in said first position and said second over-center means adapted to lock said latch means when in said second position.

5. A lift mechanism according to claim 1 in which said second pivot support means further includes a pair of stub shafts fitted into opposite ends of said support shaft and a pair of sleeve members fastened to said stub shafts and slidably mounted on said guide rods.

6. A lift mechanism according to claim 1 in which said lift arm assembly means is comprised of a tube member rotatably mounted in the truck frame, a pair of power cylinder connecting arms fastened at one end to said tube member and pivotally connected at the other end to said power cylinder, a plurality of lift arms fastened at one end to said tube member, and a pair of link arms pivotally connected at one end to said lift arms and pivotally connected at the other end to the dump body.

* * * * *